United States Patent
Koarashi

(10) Patent No.: US 7,689,858 B2
(45) Date of Patent: Mar. 30, 2010

(54) DATA-RECOVERY CONTROL DEVICE

(75) Inventor: Hiroshi Koarashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 537 days.

(21) Appl. No.: 11/640,230

(22) Filed: Dec. 18, 2006

(65) Prior Publication Data

US 2008/0126847 A1 May 29, 2008

(30) Foreign Application Priority Data

Aug. 3, 2006 (JP) .............................. 2006-212538

(51) Int. Cl.
*G06F 11/00* (2006.01)
(52) U.S. Cl. .............................................. 714/5; 714/6
(58) Field of Classification Search ................ 714/5, 714/6
See application file for complete search history.

(56) References Cited

U.S. PATENT DOCUMENTS

| | | | | |
|---|---|---|---|---|
| 5,872,906 A | * | 2/1999 | Morita et al. ................... | 714/6 |
| 6,145,028 A | * | 11/2000 | Shank et al. ................... | 710/31 |
| 6,845,465 B2 | * | 1/2005 | Hashemi ......................... | 714/6 |
| 7,228,381 B2 | * | 6/2007 | Uysal et al. .................. | 711/114 |
| 7,426,655 B2 | * | 9/2008 | Shaik et al. .................... | 714/6 |
| 2005/0086557 A1 | * | 4/2005 | Sato et al. ...................... | 714/6 |
| 2005/0108475 A1 | | 5/2005 | Yamamoto | |

FOREIGN PATENT DOCUMENTS

| | | |
|---|---|---|
| JP | 06-230903 | 8/1994 |
| JP | 2000-200157 | 7/2000 |
| JP | 2005-149374 | 6/2005 |

\* cited by examiner

*Primary Examiner*—Marc Duncan
(74) *Attorney, Agent, or Firm*—Fujitsu Patent Center

(57) ABSTRACT

A first storing unit stores therein information on a communication status relating to installing positions of a plurality of storage devices forming a disk array. A selecting unit selects a plurality of storage devices for storing data, based on stored information. A second storing unit stores recovery data recovered from a storage device from which a failure is detected from among the storage devices forming the disk array in selected storage devices in a striping manner.

11 Claims, 14 Drawing Sheets

FIG.4

SYSTEM CONFIGURATION INFORMATION
103a

| DISK DEVICE ID | SHELF ID | FC-AL-ID | RAID-ID | SPARE DISK FLAG |
|---|---|---|---|---|
| 1 | 1 | 1 | 1-1 | 0 |
| 2 | 1 | 1 | — | 1 |
| 3 | 1 | 1 | — | 1 |
| 4 | 1 | 1 | 1-2 | 0 |
| ⋮ | ⋮ | ⋮ | ⋮ | ⋮ |
| n | m | p | — | 1 |

FIG.5

SYSTEM LOAD INFORMATION
103b

| | SHELF ID | BUSY RATE |
|---|---|---|
| SHELF | 1 | 35% |
| | 2 | 7% |
| | 3 | 16% |
| | ⋮ | ⋮ |
| | m | 27% |
| | FC-AL-ID | BUSY RATE |
| FC-AL | 1 | 62% |
| | 2 | 11% |
| | 3 | 2% |
| | ⋮ | ⋮ |
| | p | 19% |

FIG.6

RECONSTRUCTION SETTING INFORMATION
103c

| PARITY FOR DATA RECOVERY | WITH PARITY |
|---|---|
| NUMBER OF SPARE DISK DEVICES FOR DATA RECOVERY | 10 |
| WRITE SIZE OF OUTPUT DESTINATION FOR DATA RECOVERY | 64KB |
| READ SIZE OF INPUT SOURCE FOR DATA RECOVERY | — |
| WRITE SIZE OF OUTPUT DESTINATION FOR DATA AGGREGATION | — |
| READ SIZE OF INPUT SOURCE FOR DATA AGGREGATION | 64KB |

FIG.8

PROCESSING-PRIORITY SETTING
INFORMATION
103d

| PROCESSING TYPE | PRIORITY |
|---|---|
| DATA-STORING/READ PROCESSING | 1 |
| RECOVERED-DATA STORING PROCESSING | 2 |
| RECOVERED-DATA AGGREGATION PROCESSING | 3 |

FIG.9

DATA-AGGREGATION-DISK
INFORMATION
103e

| DISK DEVICE ID |
|---|
| 7 |
| 8 |
| 9 |
| ⋮ |
| q |

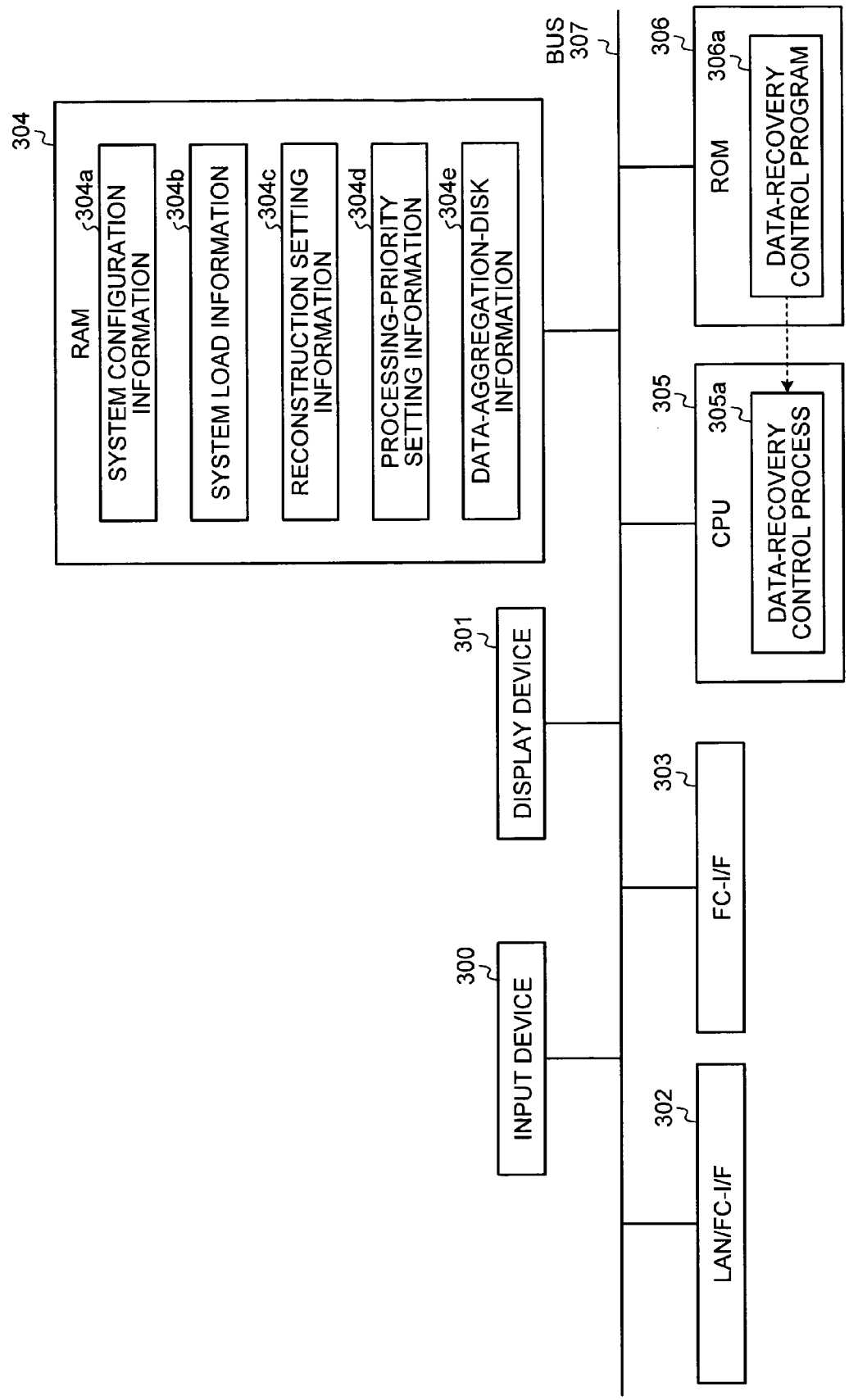

DATA-RECOVERY CONTROL DEVICE

CROSS REFERENCE TO RELATED APPLICATIONS

This application claims the benefit under 35 U.S.C. Section 119, of Japanese Patent Application No. 2006-212538, filed Aug. 3, 2006, which is hereby incorporated by reference in its entirety into this application.

BACKGROUND OF THE INVENTION

1. Field of the Invention

The present invention relates to a technology for recovering data stored in a storage device from which a failure is detected from among storage devices constituting a disk array.

2. Description of the Related Art

In a redundant-arrays-of-independent-disks (RAID) structure that includes a plurality of disk devices, when a failure occurs in a disk device, a reconstruction processing is generally performed for recovering data stored in the disk device.

With the reconstruction processing, the data stored in the failed disk device is recovered by performing an exclusive-OR operation between data and parity read from the rest of the disk devices in the same RAID structure.

The recovered data is to be stored in a disk device prepared as a spare disk device that is provided separately from the rest of the disk devices. At this moment, if the capacity of the failed disk device is smaller than the capacity of the spare disk device, a free space is to be left without being used in the spare disk device.

A technology for removing such a free space is disclosed in, for example, Japanese Patent Application Laid-Open No. 2005-149374. According to the technology, when data with a specific size needs to be stored in a disk device, a logical storage area with a required size for storing the data is formed by combining the disk devices, and the data is stored in the logical storage area.

Further, Japanese Patent Application Laid-Open No. H6-230903 and Japanese Patent Application Laid-Open No. 2000-200157 disclose technologies, in which recovered data is stored in free spaces left in each of the disk devices in which data is already stored, in a striping manner, instead of separately preparing a spare disk device.

However, with the disclosed technologies, there still is a problem that it takes a longer processing time for performing the reconstruction processing when a communication speed of transmitting the data on a communication path to a destination disk device is slow.

For example, a RAID structure using a fiber channel-arbitrated loop (FC-AL) technology includes a configuration in which a plurality of groups including the disk devices connected in a loop via a fiber channel are formed. With the above configuration, if a disk device connected to a fiber channel with a large communication load is selected as a data recovery destination for performing the reconstruction processing, a high speed can hardly be achieved in performing the reconstruction processing.

Further, when the disk devices are connected to switches while groups including the disk devices and the switches are formed in the above configuration, and when a disk device connected to a switch with a large communication load is selected as the data recovery destination for performing the reconstruction processing, it is also difficult to perform the reconstruction processing at a high speed. Moreover, if the operation speed of the disk device is slow, the reconstruction processing cannot be performed at a high speed.

Because the RAID structure becomes in a degeneration state during a performance of the reconstruction processing and redundancy of the data in the RAID structure is not to be assured, it is required to complete the reconstruction processing as fast as possible. Therefore, it is critical to select a proper disk device as the data recovery destination and perform the reconstruction processing at a high speed.

SUMMARY OF THE INVENTION

It is an object of the present invention to at least partially solve the problems in the conventional technology.

A device according to one aspect of the present invention is for performing a recovery control of data stored in a storage device from which a failure is detected from among a plurality of storage devices forming a disk array. The device includes a first storing unit that stores therein first information on a communication status relating to installing positions of the storage devices; a selecting unit that selects a plurality of storage devices for storing data, based on stored first information; and a second storing unit that stores recovery data in selected storage devices in a striping manner.

A method according to another aspect of the present invention is for performing a recovery control of data stored in a storage device from which a failure is detected from among a plurality of storage devices forming a disk array. The method includes storing first information on a communication status relating to installing positions of the storage devices; selecting a plurality of storage devices for storing data, based on stored first information; and storing recovery data in selected storage devices in a striping manner.

A computer-readable recording medium according to still another aspect of the present invention stores therein a computer program that causes a computer to execute the method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an example of the contents of system configuration information shown in FIG. 3;

FIG. 5 is an example of the contents of system load information shown in FIG. 3;

FIG. 6 is an example of the contents of reconstruction setting information shown in FIG. 3;

FIG. 8 is an example of the contents of processing-priority setting information shown in FIG. 3;

FIG. 9 is an example of the contents of data-aggregation-disk information shown in FIG. 3;

FIG. 16 is a functional block diagram of a computer hardware that realizes functions of the storage device shown in FIG. 3.

DETAILED DESCRIPTION OF THE PREFERRED EMBODIMENTS

Exemplary embodiments of the present invention are explained below in detail with reference to the accompanying drawings. The present invention is not limited to the embodiments explained below.

Figure 1:
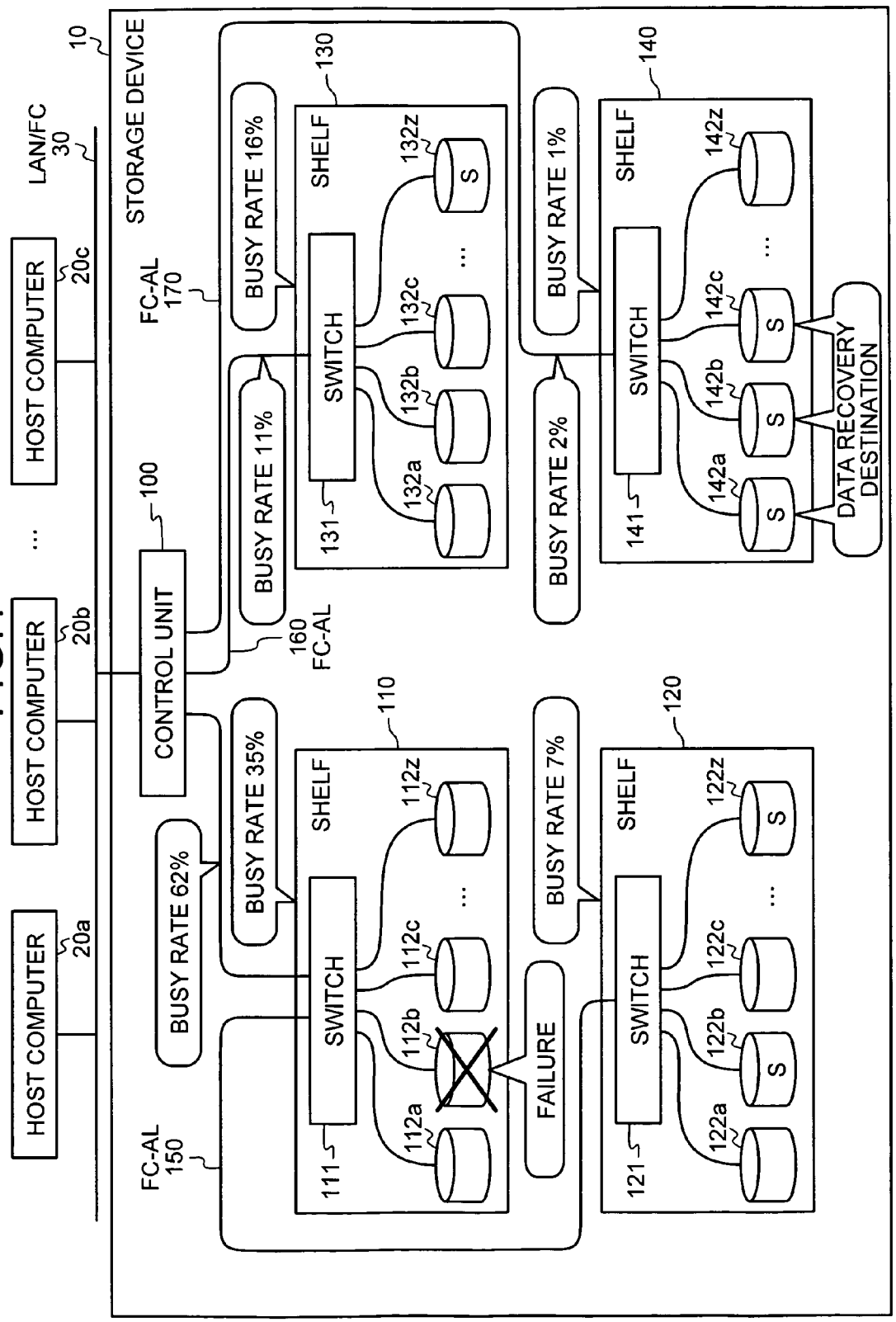
FIG. 1 is a schematic for explaining a concept of data-recovery control processing according to an embodiment of the present invention.

FIG. 1 is a schematic for explaining a concept of data-recovery control processing according to an embodiment of the present invention. A storage device 10 that performs the data-recovery control processing is connected via a local area network or a fiber channel (LAN/FC) 30 to host computers 20a to 20c that send a request of storing and reading data to the storage device 10.

Upon receiving a request of storing data from the host computers 20a to 20c, the storage device 10 stores data, and upon receiving a request of reading data from the host computers 20a to 20c, the storage device 10 reads stored data and transmits the read data to the host computers 20a to 20c.

The storage device 10 includes a control unit 100 and a plurality of shelves 110, 120, 130, and 140. The control unit 100 is connected to the shelves 110 and 120 via an FC to form a fiber channel-arbitrated loop (FC-AL) 150.

The control unit 100 is connected to the shelf 130 via an FC to form an FC-AL 160, and is connected to the shelf 140 via an FC to form an FC-AL 170.

Each of the shelves 110, 120, 130, and 140 is a disk unit that includes each of switches 111, 121, 131, and 141 and each of disk devices 112a to 112z, 122a to 122z, 132a to 132z, and 142a to 142z.

Each of the switches 111, 121, 131, and 141 is used for switching connections between the control unit 100 and each of the disk devices 112a to 112z, 122a to 122z, 132a to 132z, and 142a to 142z.

Each of the disk devices 112a to 112z, 122a to 122z, 132a to 132z, and 142a to 142z stores data and a plurality of the disk devices from among the disk devices 112a to 112z, 122a to 122z, 132a to 132z, and 142a to 142z are combined to structure each of redundant arrays of independent disks (RAIDs).

Each of the disk devices 112a to 112z, 122a to 122z, 132a to 132z, and 142a to 142z is determined whether to be used as a disk device for storing user data and parity data or to be used as a disk device of data recovery destination when a failure occurs in each of the disk devices 112a to 112z, 122a to 122z, 132a to 132z, and 142a to 142z.

It is assumed that a disk device used as the data recovery destination is called a spare disk device, which is shown with "S" in FIG. 1. It is not required to fix a placement of the spare disk device, and any disk, devices from among the disk devices 112a to 112z, 122a to 122z, 132a to 132z, and 142a to 142z can be set as the spare disk device.

The control unit 100 controls data storing processing and data read processing for each of the disk devices 112a to 112z, 122a to 122z, 132a to 132z, and 142a to 142z set in each of the shelves 110, 120, 130, and 140.

With the storage device 10, if the disk device 112b has failed, the control unit 100 performs reconstruction processing for restoring data stored in the failed disk device 112b in a spare disk device.

For example, the control unit 100 acquires information of busy rates corresponding to each of the FC-ALs 150, 160, 170, and each of the shelves 110, 120, 130, and 140. The control unit 100 specifies spare disks belonging to the FC-ALs and the shelves with low busy rates, as the data recovery destinations.

In FIG. 1, because the busy rates of the FC-AL 170 and the shelf 140 are lower than the busy rates of the FC-ALs 150 and 160, and the shelves 110, 120, and 130, and the spare disk devices 142a, 142b, and 142c belonging to the FC-AL 170 and the shelf 140 are determined as the data recovery destinations.

Figure 2:
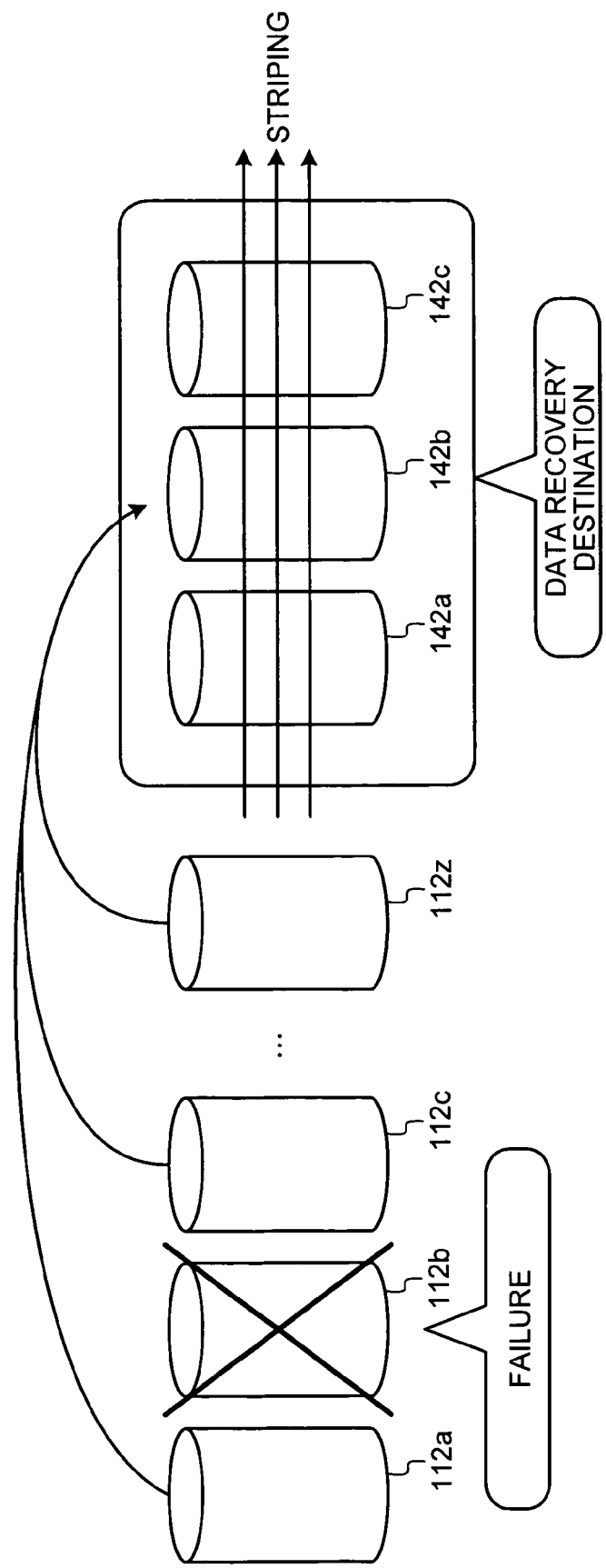
FIG. 2 is a schematic for explaining a concept of data-recovery processing according to the embodiment.

The control unit 100 restores data stored in the failed disk device 112b in the spare disk devices 142a, 142b, and 142c set as the data recovery destinations. FIG. 2 is a schematic for explaining a concept of data recovery processing according to the present embodiment.

The disk devices 112a to 112z structure a RAID and store user data as well as parity used for recovering the user data.

As shown in FIG. 2, the control unit 100 recovers data stored in the failed disk device 112b by using the user data and the parity stored in the rest of the disk devices in the same RAID, and stores the recovered data in a striping manner in the spare disk devices 142a, 142b, and 142c set as the data recovery destinations, for performing the reconstruction processing.

As described above, the spare disk devices for storing the recovered data are selected based on the information of the busy rates of the FC-ALs 150, 160, and 170, and the shelves 110, 120, 130, and 140, and the recovered data is stored to the selected spare disks in a striping manner. As a result, the data recovery destinations can be properly selected and the reconstruction processing can be performed at a high speed.

Figure 3:
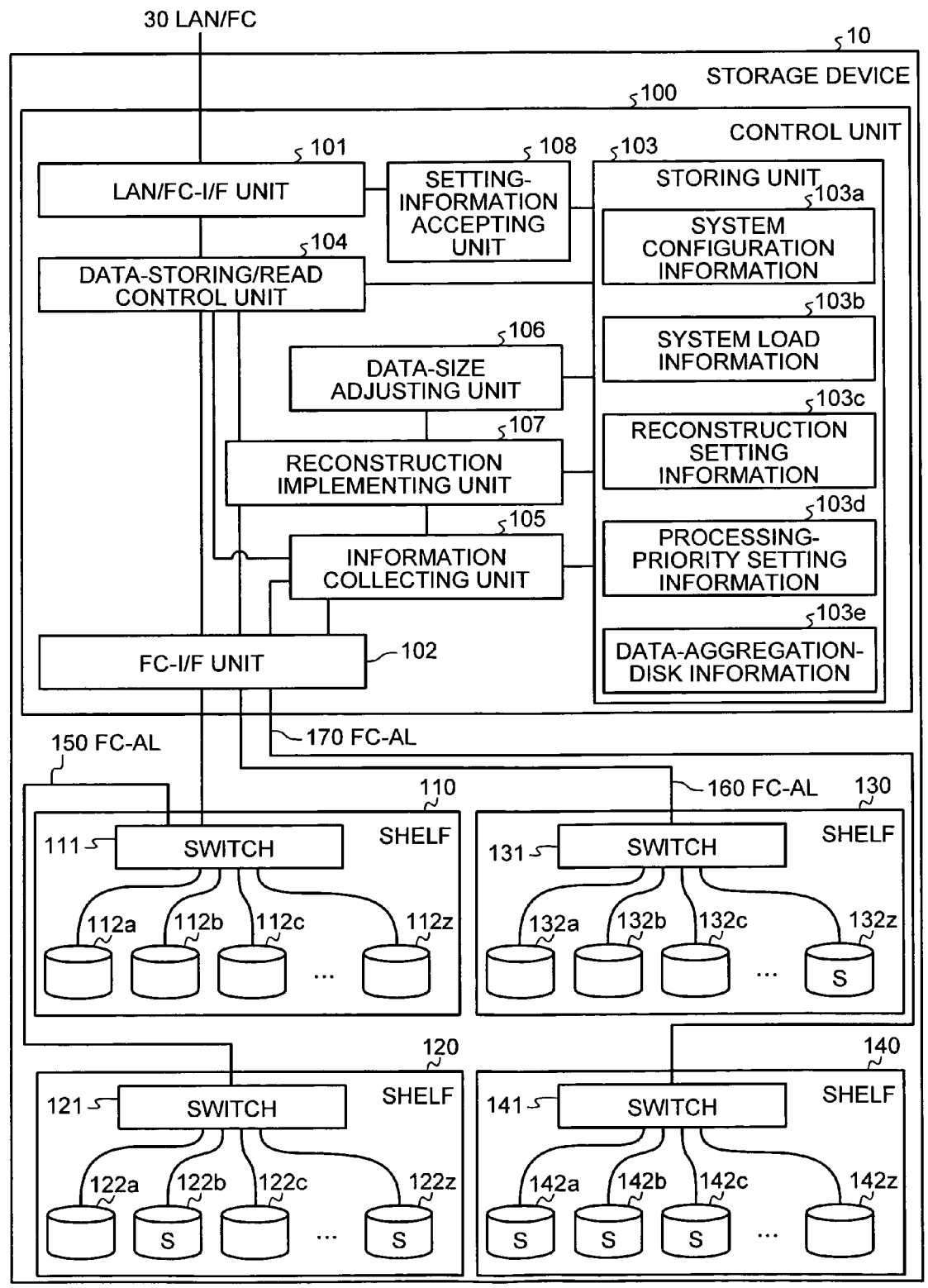
FIG. 3 is a functional block diagram of a storage device shown in FIG. 1.

FIG. 3 is a functional block diagram of the storage device 10. The storage device 10 includes the control unit 100 and the shelves 110, 120, 130, and 140. The control unit 100 and each of the shelves 110, 120, 130, and 140 are connected via the FCs to structure each of the FC-ALs 150, 160, and 170.

As explained with reference to FIG. 1, each of the shelves 110, 120, 130, and 140 is a disk unit that includes each of the switches 111, 121, 131, and 141, and each of the disk devices 112a to 112z, 121a to 122z, 132a to 132z, and 142a to 142z.

The control unit 100 controls the data storing processing and the data read processing for each of the disk devices 112a to 112z, 121a to 122z, 132a to 132z, and 142a to 142z set in each of the shelves 110, 120, 130, and 140.

The control unit 100 includes a LAN/FC-interface (I/F) unit 101, an FC-I/F unit 102, a storing unit 103, a data-storing/read control unit 104, an information collecting unit 105, a data-size adjusting unit 106, a reconstruction implementing unit 107, and a setting-information accepting unit 108.

The LAN/FC-I/F unit 101 is a network interface that transmits data to and receives data from each of the host computers 20a to 20c, via the LAN/FC 30. The FC-I/F unit 102 is a network interface that transmits data to and receives data from each of the switches 111, 121, 131, and 141, via the FCs.

The storing unit 103 is a storage device such as a memory and stores system configuration information 103a, system load information 103b, reconstruction setting information 103c, processing-priority setting information 103d, and data-aggregation-disk information 103e.

The system configuration information 103a is information on a device structure of the storage device 10. FIG. 4 is an example of the contents of the system configuration information 103a. Information of a disk device ID, a shelf ID, an FC-AL-ID, a RAID-ID, and a spare disk flag are registered in the system configuration information 103a.

The disk device ID is an identification number for identifying each of the disk devices 112a to 112z, 121a to 122z, 132a to 132z, and 142a to 142z. The shelf ID is an identification number for identifying each of the shelves 110, 120, 130, and 140 to indicate in which shelf each of the disk devices 112a to 112z, 121a to 122z, 132a to 132z, and 142a to 142z is set.

The FC-AL-ID is an identification number for identifying each of the FC-ALs 150, 160, and 170 to indicate to which each of the disk devices 112a to 112z, 121a to 122z, 132a to 132z, and 142a to 142z belongs.

The RAID-ID is an identification number for identifying each of the RAIDs to which each of the disk devices 112a to 112z, 121a to 122z, 132a to 132z, and 142a to 142z belongs. For example, if the RAID-ID is "x-y", it is determined that a corresponding disk device from among the disk devices 112a to 112z, 121a to 122z, 132a to 132z, and 142a to 142z is a y-th disk device in an x-th RAID structure.

The spare disk flag is a flag that indicates whether each of the disk devices 112a to 112z, 121a to 122z, 132a to 132z, and 142a to 142z is the spare disk device. If the flag is "0", it is determined that each of the disk devices 112a to 112z, 121a to 122z, 132a to 132z, and 142a to 142z is a normal disk device used for storing the user data. If the flag is "1", it is determined that each of the disk devices 112a to 112z, 121a to 122z, 132a to 132z, and 142a to 142z is the spare disk device not used for storing the user data.

Referring back to FIG. 3, the system load information 103b is information on loads of each of the FC-ALs 150, 160, and 170, and each of the shelves 110, 120, 130, and 140. FIG. 5 is an example of the contents of the system load information 103b.

Information of the shelf ID of each of the shelves 110, 120, 130, and 140, the FC-AL-ID of each of the FC-ALs 150, 160, and 170, and information of the busy rates corresponding to each of the shelf-IDs and FC-AL-IDs are registered in the system load information, 103b.

The shelf ID and the FC-AL-ID are the same as those explained with reference to FIG. 4. The busy rate is information of load size of communication processing for the shelves and the FC-ALs, which indicates a ratio of actual throughput of the communication processing to maximum throughput of the communication processing of the shelves and the FC-ALs.

Referring back to FIG. 3, the reconstruction setting information 103c is setting information to be referred to when the reconstruction processing is performed. FIG. 6 is an example of the contents of the reconstruction setting information 103c.

Information of parity for data recovery, number of the spare disk devices for the data recovery, a write size of output destination for the data recovery, a read size of input source for the data recovery, a write size of output destination for data aggregation, and a read size of input source for the data aggregation are registered in the reconstruction setting information 103c.

The parity for the data recovery is setting information for indicating whether data is to be stored with the parity when recovered data obtained by recovering data stored in the failed disk device is to be stored in the spare disk devices. The number of the spare disk devices for the data recovery is setting information of the number of the spare disk devices used as destinations for storing the recovered data when the recovered data is to be stored in the spare disk devices.

When the recovered data is stored with the parity in the spare disk devices, the number of the spare disk devices for the data recovery is set more than three. In this case, the parity is stored in a spare disk device from among the set spare disk devices and the recovered data is stored in the rest of the spare disk devices by the striping. Accordingly, the recovered data can be stored in the spare disk devices at a high speed.

When the recovered data is stored without the parity in the spare disk devices, the number of the spare disk devices for the data recovery is set more than two. In this case, the recovered data is stored in the spare disk devices by the striping, and therefore, the recovered data can be stored in the spare disk devices at a high speed.

The write size of the output destination for the data recovery is information of a data write size for each spare disk device, used when the recovered data is written into the spare disk devices by the striping.

The read size of the input source for the data recovery is information of a data read size for each disk device, used when the user data and the parity used for generating the recovered data are read from the disk devices.

If the write size of the output destination for the data recovery has been set while the read size of the input source for the data recovery has not, the read size is determined by (read size of the input source for the data recovery)=(write size of the output destination for the data recovery)×(number of the spare disk devices for storing the recovered data).

Namely, because the recovered data is stored in the spare disk devices by the striping, a data size for reading the user data and the parity used for generating the recovered data from each of the disk devices is determined by multiplying a data size for writing the recovered data into a spare disk device by the number of the spare disk devices for storing the recovered data.

If the read size of the input source for the data recovery has been set while the write size of the output destination for the data recovery has not, the write size is determined by (write size of the output destination for the data recovery)=(read size of the input source for the data recovery)/(number of the spare disk devices for storing the recovered data).

Namely, because the recovered data is stored in the spare disk devices by the striping, a data size for writing the recovered data into a spare disk device is determined by dividing a data size for reading the user data and the parity used for generating the recovered data from each of the disk devices by the number of the spare disk devices for storing the recovered data.

If both the write size of the output destination and the read size of the input source for the data recovery have been set, a data size for writing the recovered data into a spare disk device is determined as the write size of the output destination for the data recovery and a data size for reading the user data and the parity used for generating the recovered data from each of the disk devices is determined as the read size of the input source for the data recovery.

By performing data buffering, a conversion of a data size from the data size for reading the user data and the parity from each of the disk devices into the data size for writing the recovered data to the spare disk devices is realized.

The write size of the output destination for the data aggregation is information of a data write size for aggregating the recovered data stored in the spare disk devices by the striping in a single spare disk device.

Figure 7:
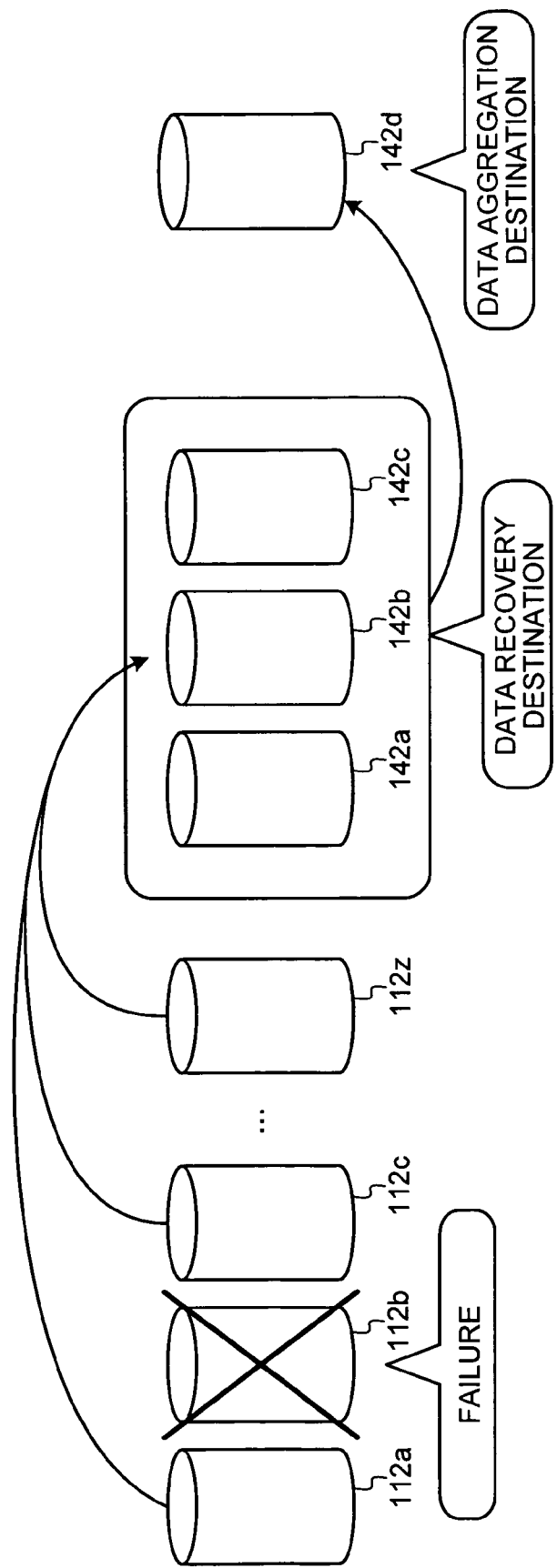
FIG. 7 is a schematic for explaining a concept of aggregation processing of recovered data according to the embodiment.

FIG. 7 is a schematic for explaining a concept of aggregation processing of the recovered data according to the present embodiment. After the recovered data is stored in the spare disk devices 142a, 142b, and 142c, a processing for aggregating the recovered data stored in the spare disk devices 142a, 142b, and 142c in a single spare disk device is performed.

Accordingly, it is possible to make a structure of the spare disk devices for storing the recovered data simple and make maintenance and management of the spare disk devices easy. Because the recovered data has been stored in the spare disk devices 142a, 142b, and 142c and the redundancy of the data has been assured, it is not required to perform the aggregation processing in a short time.

After the recovered data is aggregated in the spare disk device 142d, the failed disk device 112b is to be replaced with the spare disk device 142d to reconstruct the same RAID structure used before the occurrence of the failure.

Referring back to FIG. 6, the read size of the input source for the data aggregation is information of a data read size for each spare disk device when the recovered data is read from each of the spare disk devices to aggregate the recovered data stored in the spare disk devices by the striping in a single spare disk device.

If the write size of the output destination for the data aggregation has been set while the read size of the input source for the data aggregation has not, the read size is determined by (read size of the input source for the data aggregation)=(write size of the output destination for the data aggregation)×(number of the spare disk devices for storing the recovered data).

Namely, because the recovered data is stored in the spare disk devices in a striping manner, and the recovered data is read to be stored in a single spare disk device, the data size for reading the recovered data from each of the spare disk devices is determined by dividing the data size for aggregating the recovered data in a single spare disk device by the number of the spare disk devices in which the recovered data is stored.

If the read size of the input source for the data aggregation has been set while the write size of the output destination for the data aggregation has not, the write size is determined by (write size of the output destination for the data aggregation) =(read size of the input source for the data aggregation)/ (number of the spare disk devices for storing the recovered data).

Namely, because the recovered data is stored in the spare disk devices in a striping manner, and the recovered data is read to be stored in a single spare disk device, a data size for aggregating the recovered data in a single spare disk device is determined by multiplying a data size for reading the recovered data from each of the spare disk devices by the number of the spare disk devices in which the recovered data is stored.

If both the write size of the output destination and the read size of the input source for the data aggregation have been set, a data size for aggregating the recovered data in a single spare disk device is determined as the write size of the output destination for the data aggregation and a data size for reading the recovered data from each of the spare disk devices is determined as the read size of the input source for the data aggregation.

By performing the data buffering, a conversion of a data size from the data size for reading the recovered data from each of the spare disk devices into the data size for aggregating the recovered data in a single spare disk device is realized.

The processing-priority setting information 103d is setting information of priority of processings performed by the storage device 10. FIG. 8 is an example of the contents of the processing-priority setting information 103d. Information of a processing type and a priority of the processing are registered in the processing-priority setting information 103d.

The processing type is information of the type of the processings performed by the storage device 10. The priority is a priority order for performing each of the processings. In FIG. 8, numeral "1" corresponds to the highest priority and the priority decreases as the numeral decreases. With the priority order, the processing with the highest priority is primarily performed and the processings with the lower priorities are successively performed.

According to the present embodiment, the priority is determined by the priority order. However, it is possible to determine the priority by using ratios. For example, the priority is determined by the ratio of processing time of each of the processings performed by the control unit 100. In this case, each of the processings is performed so that the processing time of each of the processings performed by the control unit 100 corresponds to the set ratio in a predetermined time.

Referring back to FIG. 3, the data-aggregation-disk information 103e is information on the spare disk devices used as aggregation destinations for the recovered data, which is used if a disk device that has stored the user data is failed and when the recovered data stored in the spare disk devices by the striping is aggregated in a single spare disk device.

FIG. 9 is an example of the contents of the data-aggregation-disk information 103e. Information of the disk device ID is registered in the data-aggregation-disk information 103e.

The disk device ID is an identification number for identifying a spare disk device in which a storage area is initialized, a health check for determining an occurrence of a failure in the disk device is implemented, and the occurrence of a failure is not detected by the health check.

A spare disk device which disk device ID is registered in the data-aggregation-disk information 103e is excluded from the spare disk devices for storing the recovered data by the striping.

Referring back to FIG. 3, the data-storing/read control unit 104 performs data storing control and data read control to the disk devices 112a to 112z, 122a to 122z, 132a to 132z, and 142a to 142z, when accepting a request of storing or reading data from the host computers 20a to 20c.

For example, the data-storing/read control unit 104 reads the system configuration information 103a and acquires information on the RAID structure and the setting positions (belonged shelves and FC-ALs) of the disk devices 112a to 112z, 122a to 122z, 132a to 132z, and 142a to 142z.

The data-storing/read control unit 104 performs the data storing control and the data read control for each of the disk devices 112a to 112z, 122a to 122z, 132a to 132z, and 142a to 142z based on the acquired information.

The information collecting unit 105 is a processing unit that collects information on operation status of the storage device 10. For example, the information collecting unit 105 determines whether each of the disk devices 112a to 112z, 122a to 122z, 132a to 132z, and 142a to 142z is used for storing the user data, by acquiring data storing information from the data-storing/read control unit 104, and sets the spare disk flag to either "0" or "1" in the system configuration information 103a based on the determination.

The information collecting unit 105 collects information of the busy rates corresponding to each of the shelves 110, 120, 130, and 140 and each of the FC-ALs 150, 160, and 170, by monitoring the processing status of the data-storing/read control unit 104. Thereafter, the information collecting unit 105 stores the collected information as the system load information 103b to the storing unit 103.

The information collecting unit 105 detects the occurrence of a device failure in the disk devices 112a to 112z, 122a to 122z, 132a to 132z, and 142a to 142z included in the RAID structure, and sends a notice of the occurrence of a device failure to the reconstruction implementing unit 107.

The information collecting unit 105 sends a health packet to the spare disk devices which disk device IDs are registered in the data-aggregation-disk information 103e to check whether the device failure has occurred.

If the information collecting unit 105 detects the spare disk device in which the device failure has occurred, the information collecting unit 105 deletes the disk device ID corresponding to the detected spare disk device from the data-aggregation-disk information 103e and excludes the detected spare disk device from the spare disk devices to be used as the aggregation destinations for the recovered data.

The data-size adjusting unit 106 is a processing unit that adjusts the data size for writing data to and reading data from each of the disk devices 112a to 112z, 122a to 122z, 132a to 132z, and 142a to 142z, based on the write size for the data recovery, the read size for the data recovery, the write size for the data aggregation, and the read size for the data aggregation, when the reconstruction processing is performed.

For example, the data-size adjusting unit 106 sets the data write size for each spare disk device when the recovered data is written into the spare disk devices by the striping, and the data read size for each disk device when the user data and the parity for generating the recovered data is read from the disk devices.

If the write size for the data recovery and the read size for the data recovery have not been set in the reconstruction setting information 103c, the data-size adjusting unit 106 sets the write size and the read size by predetermined default values.

The data-size adjusting unit 106 sets a data write size for aggregating the recovered data stored in the spare disk devices by the striping in a single spare disk device, and a data read size for each spare disk device for reading the recovered data from each of the spare disk devices when the recovered data stored in the spare disk devices by the striping is aggregated in a single spare disk device.

If both the write size for the data aggregation and the read size for the data aggregation have not been set in the reconstruction setting information 103c, the data-size adjusting unit 106 sets the write size and the read size by predetermined default values.

The reconstruction implementing unit 107 is a processing unit that recovers the data stored in the failure detected disk devices from among the disk devices 112a to 112z, 122a to 122z, 132a to 132z, and 142a to 142z and performs the reconstruction processing to reconstruct the same RAID structure, when the information collecting unit 105 detects the occurrence of a failure in the disk devices 112a to 112z, 122a to 122z, 132a to 132z, and 142a to 142z included in the RAID structure.

For example, when the occurrence of a failure is detected in the disk devices 112a to 112z, 122a to 122z, 132a to 132z, and 142a to 142z, the reconstruction implementing unit 107 refers to the system load information 103b to determine the spare disk devices as the data recovery destinations from among the disk devices belonging to any of the FC-ALs 150, 160, and 170 and the shelves 110, 120, 130, and 140 with low busy rates.

In this case, the reconstruction implementing unit 107 acquires the number of the spare disk devices for the data recovery registered in the reconstruction setting information 103c shown in FIG. 6, and sets the same number of the spare disk devices as the data recovery destinations.

The reconstruction implementing unit 107 reads the user data and the parity from the disk devices other than the failed disk devices, and recovers the data using the read user data and the parity. The reconstruction implementing unit 107 stores the recovered data in the spare disk devices set as the data recovery destinations, by the striping.

If the parity for the data recovery in the reconstruction setting information 103c shown in FIG. 6 is set as "with parity", the reconstruction implementing unit 107 generates new parity corresponding to the recovered data and stores the recovered data and the generated parity in the spare disk devices set as the data recovery destinations, by the striping.

After storing the recovered data in the spare disk devices, the reconstruction implementing unit 107 refers to the data-aggregation-disk information 103e shown in FIG. 9 to select a single spare disk device for aggregating the recovered data stored in the spare disk devices in a striping manner. Thereafter, the reconstruction implementing unit 107 performs a processing for aggregating the recovered data in the selected spare disk device.

When performing the storing processing and the aggregation processing for the recovered data, the reconstruction implementing unit 107 performs processings of reading and writing data with the data size set by the data-size adjusting unit 106.

When the aggregation processing for the recovered data is completed, the reconstruction implementing unit 107 replaces the failed disk device with the spare disk device in which the recovered data has been aggregated. For example, the reconstruction implementing unit 107 changes the RAID ID, in the system configuration information 103a, of the spare disk device in which the recovered data has been aggregated to the RAID ID corresponding to the failed disk device and deletes the RAID ID previously used for the failed disk device to reconstruct the RAID structure.

The reconstruction implementing unit 107 changes the spare disk flag of the spare disk device in which the recovered data has been aggregated to "0" and changes the status of the disk device from the spare disk device to a disk device for storing the user data, in the system configuration information 103a. The spare disk devices that have stored the recovered data are to be used again as the spare disk devices in the next reconstruction processing.

The reconstruction implementing unit 107 refers to the processing-priority setting information 103d shown in FIG. 8 to perform processing of storing the recovered data. Further, when receiving a request of performing the data-storing/read processing from the host computers 20a to 20c while performing the data aggregation processing, the reconstruction implementing unit 107 primarily performs a processing with the highest priority based on the priority order.

With an example shown in FIG. 8, because the priority of the data-storing/read processing is the highest compared to the priorities of the recovered-data storing processing and the recovered-data aggregation processing, the reconstruction implementing unit 107 stops the recovered-data storing processing and the recovered-data aggregation processing and instructs the data-storing/read control unit 104 to perform the data-storing/read processing.

It is explained that the recovered data is aggregated in a single spare disk device, and thereafter, the failed disk device is replaced with the spare disk device in which the recovered data has been aggregated. However, if the failed disk device is replaced with a spare disk device before the aggregation processing of the recovered data is completed, the recovered data is to be aggregated in the spare disk device that has been set by the replacement.

Figure 10:
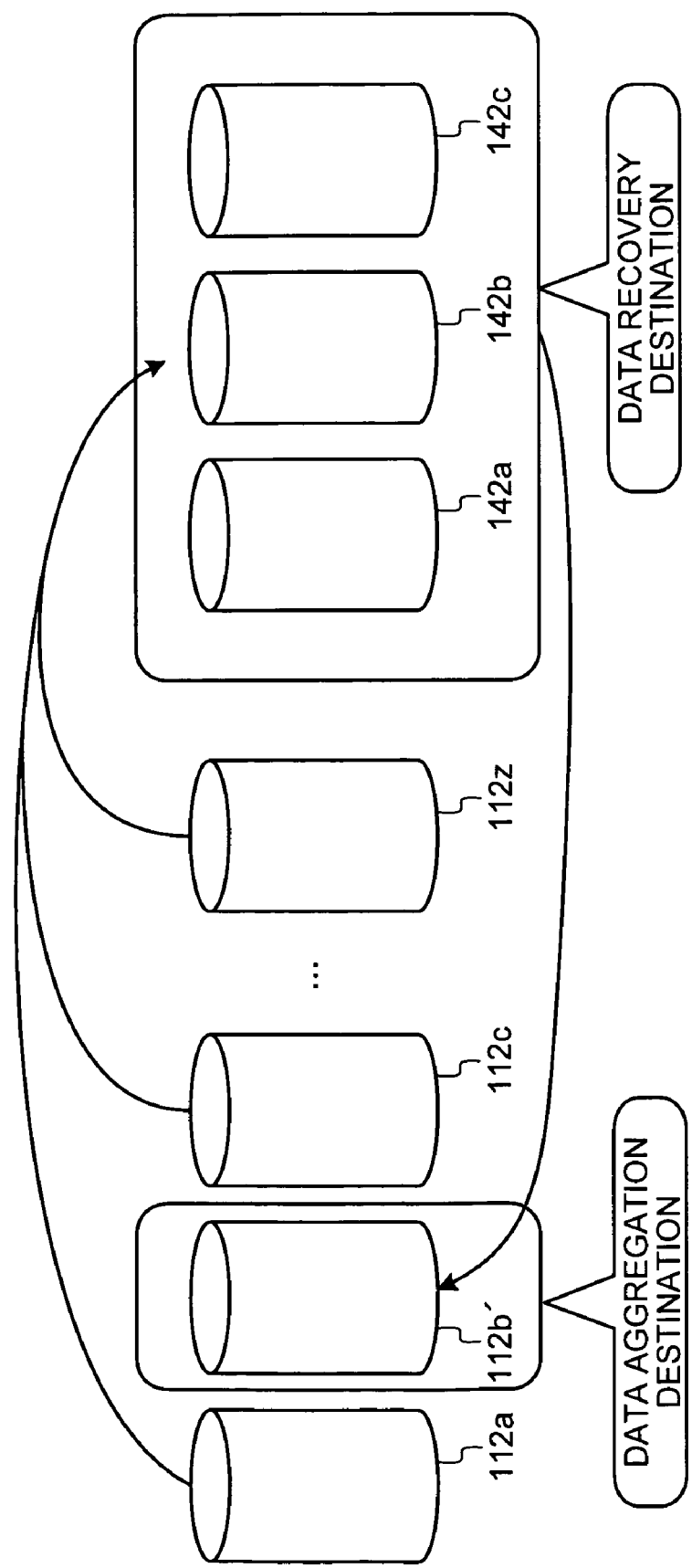
FIG. 10 is a schematic for explaining the aggregation processing of the recovered data when failed disk device is replaced, according to the embodiment.

FIG. 10 is a schematic for explaining the aggregation processing of the recovered data when a failed disk device has been replaced, according to the present embodiment. In this case, the reconstruction implementing unit 107 detects whether the failed disk device is replaced with the spare disk device 112b' before the aggregation processing is completed.

For example, the reconstruction implementing unit 107 checks whether the RAID-ID of the spare disk device in which the recovered data has been aggregated is changed to the RAID-ID corresponding to the failed disk device and the RAID-ID previously used for the failed disk device is deleted.

When detecting that the failed disk device has been replaced with the spare disk device 112b', the reconstruction implementing unit 107 stops the aggregation processing currently being performed and starts to perform a processing for aggregating the recovered data in the spare disk device 112b'.

Although the spare disk device 142d separated from the spare disk devices 142a, 142b, and 142c in which the recovered data is stored is set as the aggregation destinations for the recovered data in FIG. 7, it is possible to set one of the spare disk devices 142a, 142b, and 142c in which the recovered data is stored as the aggregation destination for the recovered data.

Figure 11:
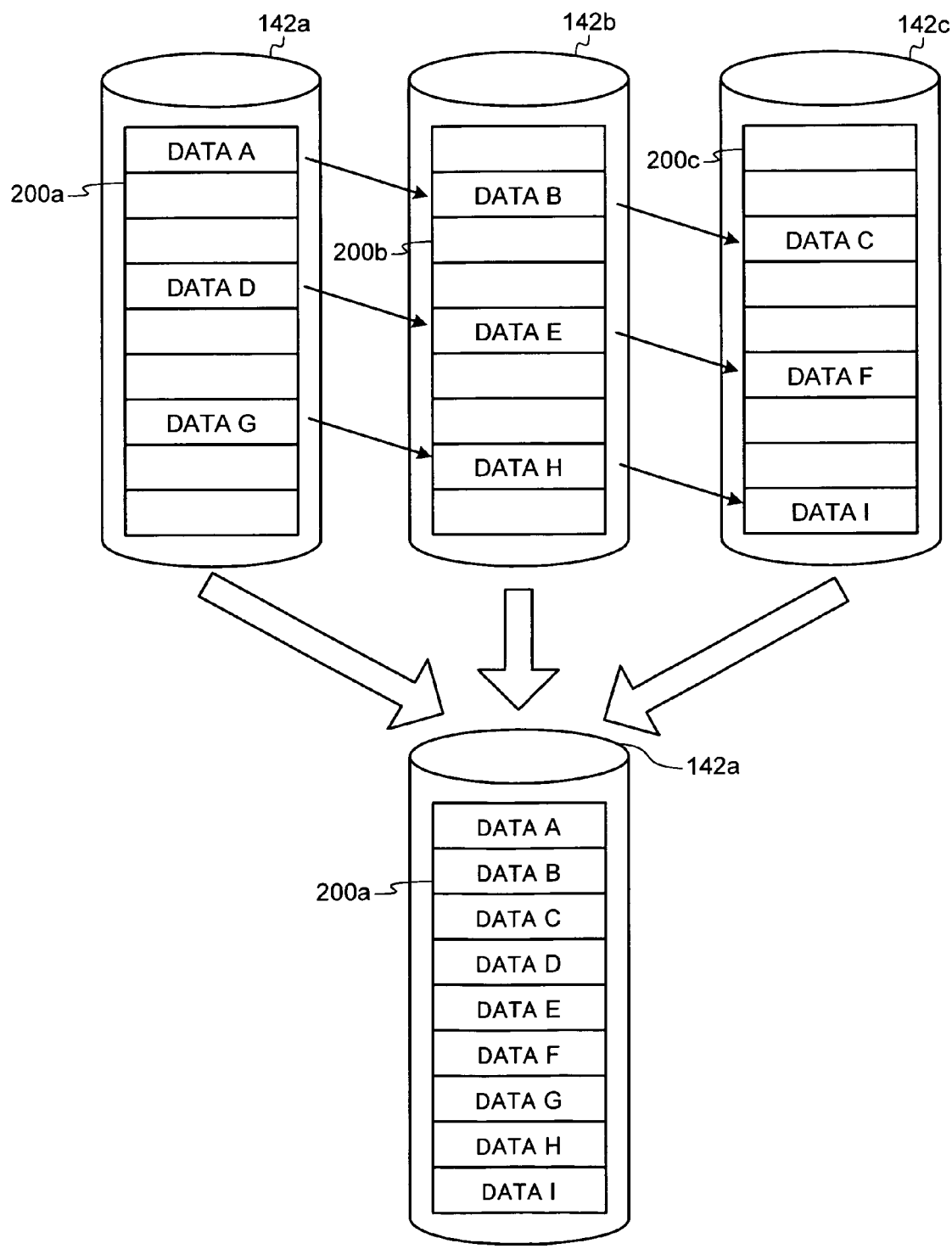
FIG. 11 is a schematic for explaining an arrangement of storing the recovered data in each of spare disk devices, according to the embodiment.

FIG. 11 is a schematic for explaining an arrangement of storing the recovered data in each of the spare disk devices according to the present embodiment. It is assumed that the recovered data stored in a striping manner in each of storage areas 200a, 200b, and 200c in each of the spare disk devices 142a, 142b, and 142c is to be aggregated in the storage area 200a in the spare disk device 142a.

When controlling the spare disk devices 142a, 142b, and 142c to store the recovered data in each of the storage areas 200a, 200b, and 200c by the striping, the reconstruction implementing unit 107 stores each pieces of data A to I in different blocks on different stripes across the storage areas 200a, 200b, and 200c.

For example, the reconstruction implementing unit 107 stores the data A in the spare disk device 142a, and thereafter, saves the storage areas corresponding to the storage areas used for storing the data B in the storage area 200b and for storing the data C in the storage area 200c, in the storage area 200a.

When storing the data D in the spare disk device 142a, the reconstruction implementing unit 107 stores the data D in the storage area next to the saved storage areas. The reconstruction implementing unit 107 controls the spare disk devices 142a, 142b, and 142c and performs the above processings to all the storage areas 200a, 200b, and 200c.

When aggregating the recovered data, the reconstruction implementing unit 107 selects the storage area 200a from among the storage areas 200a, 200b, and 200c, and stores the data B, C, E, F, H and I stored in the storage areas 200b and 200c in the saved storage areas of the storage area 200a to combine the data A to I in the storage area 200a.

By storing the data A to I in different blocks on different stripes across the storage areas 200a, 200b, and 200c, it becomes possible to easily aggregate the data A to I in the spare disk device 142a. Although it is explained that the data A to I are aggregated in the spare disk device 142a, the spare disk devices 142b and 142c can be used as destinations for aggregating the data A to I.

Referring back to FIG. 3, the setting-information accepting unit 108 accepts setting information related to data storing, data reading and a control of the reconstruction processing in the storage device 10, from other devices via the LAN/FC 30. Thereafter, the setting-information accepting unit 108 stores the accepted information as the reconstruction setting information 103c, the processing-priority setting information 103d, and the data-aggregation-disk information 103e.

Figure 12:
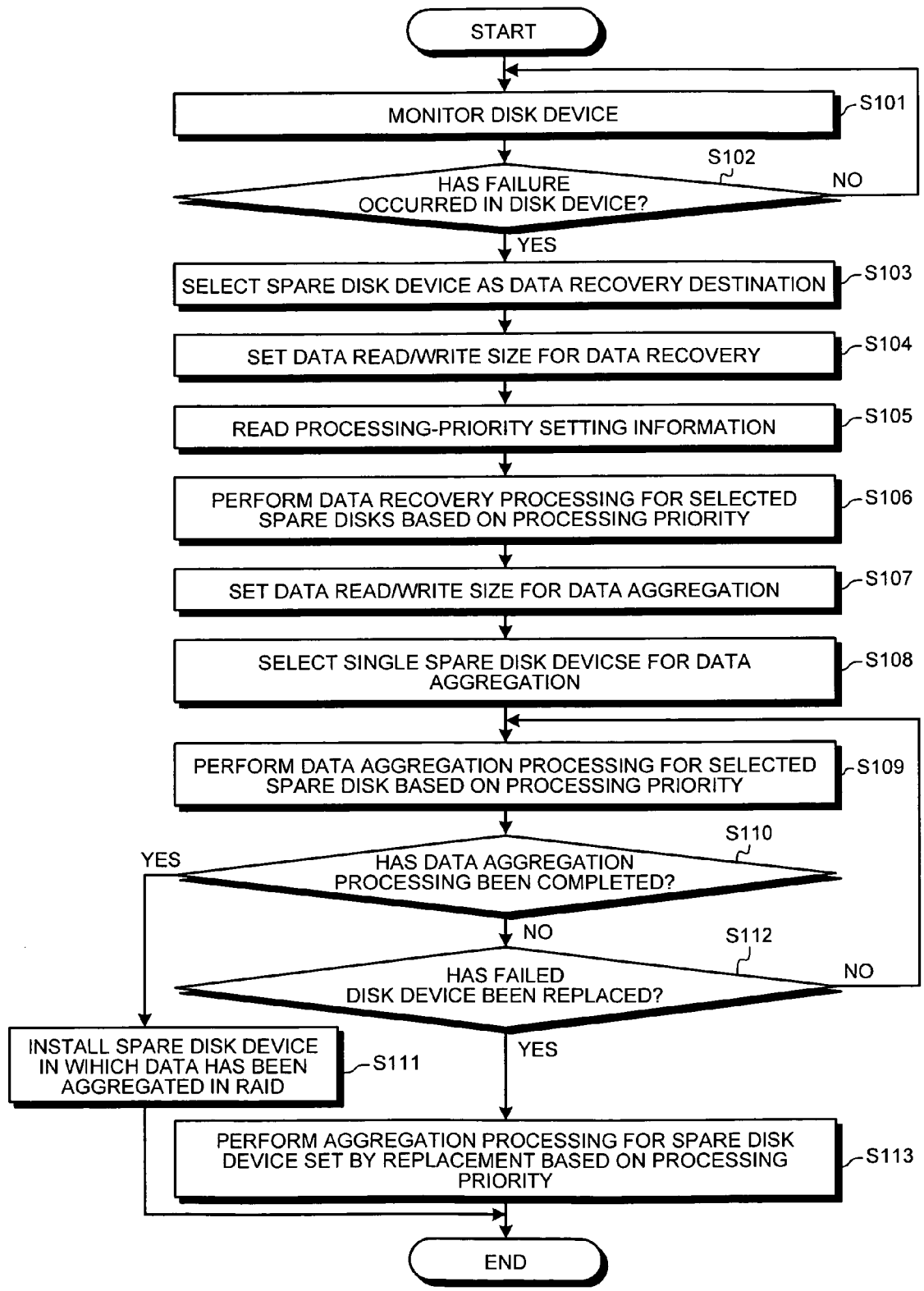
FIG. 12 is a flowchart of a processing procedure of reconstruction processing according to the embodiment.

FIG. 12 is a flowchart of a processing procedure of the reconstruction processing according to the present embodiment. The information collecting unit 105 in the storage device 10 monitors each of the disk devices 112a to 112z, 122a to 122z, 132a to 132z, and 142a to 142z (step S101), and checks whether a failure has occurred in each of the disk devices 112a to 112z, 122a to 122z, 132a to 132z, and 142a to 142z (step S102).

When the failure has not occurred in each of the disk devices 112a to 112z, 122a to 122z, 132a to 132z, and 142a to 142z (NO at step S102), the process returns to step S101 and the information collecting unit 105 continues to monitor each of the disk devices 112a to 112z, 122a to 122z, 132a to 132z, and 142a to 142z.

When the failure has occurred in each of the disk devices 112a to 112z, 122a to 122z, 132a to 132z, and 142a to 142z (YES at step S102), the reconstruction implementing unit 107 performs processing of selecting the spare disk devices as the data recovery destinations (step S103), which is explained later with reference to FIG. 13.

The reconstruction implementing unit 107 performs processing of setting the data read size and the data write size for recovering the data in the selected spare disk devices (step S104), which is explained later with reference to FIG. 14.

The reconstruction implementing unit 107 reads the processing-priority setting information 103d from the storing unit 103 (step S105), and performs the data recovery processing for the selected spare disk devices based on the priority of the processings (step S106).

For example, when the storage device 10 accepts a request of data storing and data reading from the host computers 20a to 20c, the reconstruction implementing unit 107 performs the data recovery processing as well as data storing processing or data read processing based on the priority set in the processing-priority setting information 103d.

Thereafter, the reconstruction implementing unit 107 performs processing of setting the data read size and the data write size for aggregating the recovered data stored in the spare disk devices (step S107), which is explained later with reference to FIG. 15.

The reconstruction implementing unit 107 selects a single spare disk device for aggregating the recovered data (step S108), and performs the data aggregation processing for the selected spare disk device based on the priority of the processings (step S109).

For example, when the storage device 10 accepts a request of data storing and data reading form the host computers 20a to 20c, the reconstruction implementing unit 107 performs the data aggregation processing as well as data storing processing or data read processing based on the priority set in the processing-priority setting information 103d.

The reconstruction implementing unit 107 checks whether the data aggregation processing has been completed (step S110). When the data aggregation processing has been completed (YES at step S110), the reconstruction implementing unit 107 separates the failed disk device from the RAID structure, performs processing of installing the spare disk device in which the recovered data has been aggregated in the RAID structure (step S111), and terminates the reconstruction processing.

For example, the reconstruction implementing unit 107 changes the RAID-ID of the spare disk device in which the recovered data has been aggregated to the RAID-ID corresponding to the failed disk device and deletes the RAID-ID previously used for the failed disk device to reconstruct the same RAID structure.

The reconstruction implementing unit 107 changes the spare disk flag of the spare disk device in which the recovered data is aggregated to "0" and changes the status of the disk device from the spare disk device to a disk device for storing the user data, in the system configuration information 103a.

When the data aggregation processing has not been completed (NO at step S110), the reconstruction implementing unit 107 checks whether the failed disk device from among the disk devices 112a to 112z, 122a to 122z, 132a to 132z, and 142a to 142z has been replaced with the spare disk device, with the updated system configuration information 103a (step S112).

When the failed disk device from among the disk devices 112a to 112z, 122a to 122z, 132a to 132z, and 142a to 142z has not been replaced with the spare disk device (NO at step S112), the process returns to step S109 and continues the processing.

When the failed disk device from among the disk devices 112a to 112z, 122a to 122z, 132a to 132z, and 142a to 142z has been replaced with the spare disk device (YES at step S112), the reconstruction implementing unit 107 stops the aggregation processing currently being performed and starts to perform the aggregation processing for the spare disk device that has been set by the replacement, based on the priority of the processings (step S113), and terminates the reconstruction processing.

When the storage device 10 accepts a request of data storing and data reading form the host computers 20a to 20c, the reconstruction implementing unit 107 performs the data aggregation processing as well as data storing processing or data read processing based on the priority set in the processing-priority setting information 103d.

Figure 13:
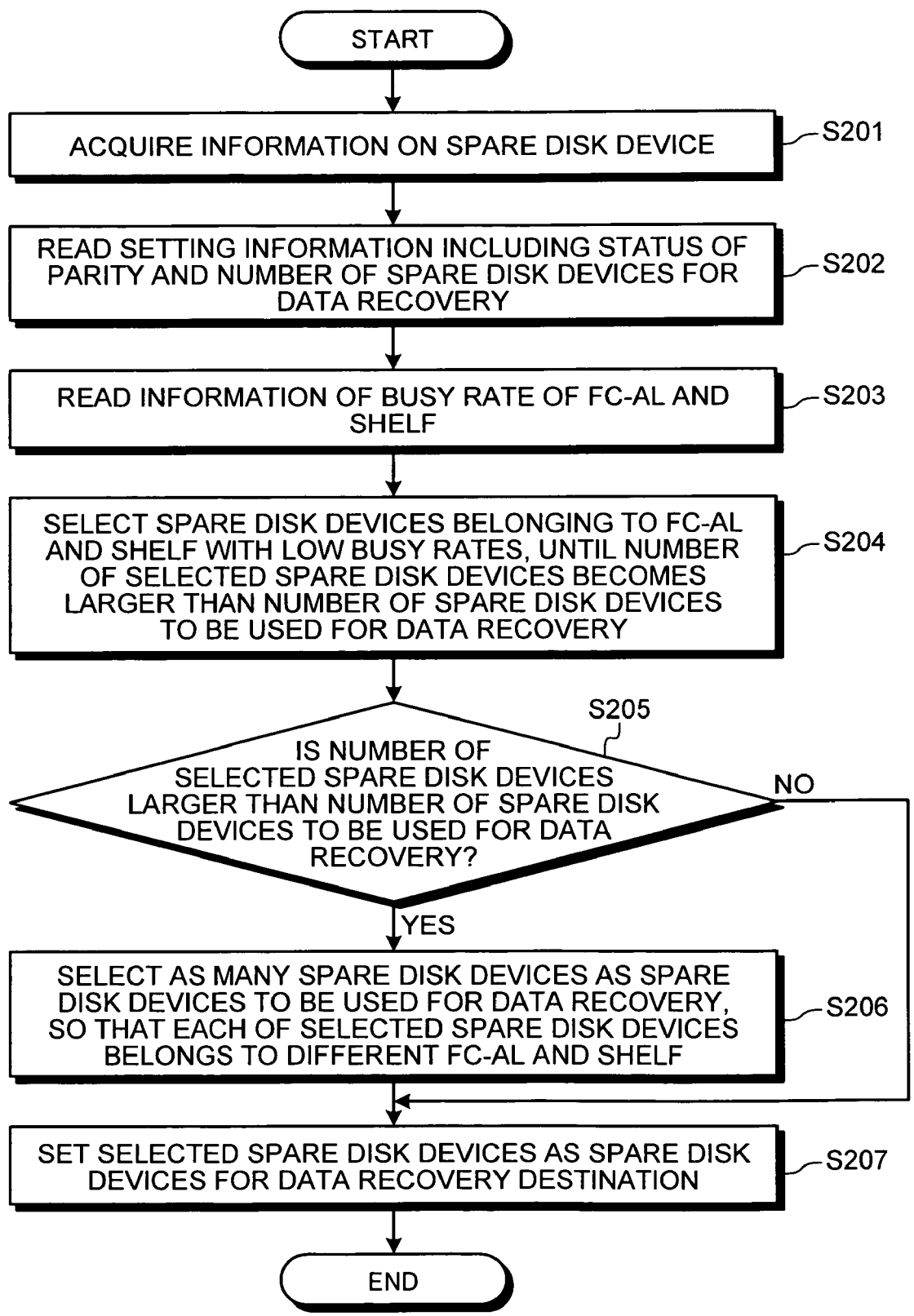
FIG. 13 is a flowchart of a processing procedure shown in FIG. 12, of selecting a spare disk device as data recovery destination.

FIG. 13 is a flowchart of a processing procedure shown in FIG. 12, of selecting the spare disk devices as data recovery destinations.

The reconstruction implementing unit 107 reads information on the spare disk devices from the system configuration information 103a (step S201). For example, the reconstruction implementing unit 107 reads the disk device ID, the shelf ID, and the FC-AL-ID associated with the spare disk flag of "0" in the system configuration information 103a.

The reconstruction implementing unit 107 reads setting information including status of the parity for indicating whether the parity is written into the spare disk device when the data is recovered to the spare disk devices, and the number of the spare disk devices used for the data recovery (step S202).

The reconstruction implementing unit 107 reads information of the busy rates corresponding to the FC-ALs and the shelves, to which each of the spare disk devices belong, from the system load information 103b, based on the information of the FC-ALs and the shelves read at step S201 (step S203).

The reconstruction implementing unit 107 continues to select the spare disk devices belonging to the FC-ALs and the shelves with low busy rates until the number of the selected spare disk devices becomes larger than the number of the spare disk devices to be used for the data recovery (step S204).

For example, the reconstruction implementing unit 107 determines each of thresholds for the busy rates of each of the FC-ALs and the shelves, and selects the spare disk devices belonging to the FC-ALs and the shelves with the busy rates smaller than each of the thresholds.

The reconstruction implementing unit 107 checks whether the number of the selected spare disk devices is larger than the number of the spare disk devices to be used for the data recovery. When the number of the selected spare disk devices is smaller than the number of the spare disk devices to be used for the data recovery, the reconstruction implementing unit 107 makes the thresholds of the busy rates of the FC-ALs and the shelves larger, and selects again the spare disk devices based on the new thresholds.

The reconstruction implementing unit 107 continues the above processing until the number of the selected spare disk devices becomes larger than the number of the spare disk devices to be used for the data recovery. It should be noted that the spare disk devices can also be selected in different manners.

Thereafter, the reconstruction implementing unit 107 checks whether the number of the selected spare disk devices is larger than the number of the spare disk devices to be used for the data recovery (step S205). When the number of the selected spare disk devices is larger than the number of the spare disk devices to be used for the data recovery (YES at step S205), the reconstruction implementing unit 107 selects as many spare disk devices as the spare disk devices to be used for the data recovery so that each of the selected spare disk devices belongs to different FC-ALs and the shelves (step S206).

For example, if the spare disk devices can be selected from different FC-ALs and shelves, the reconstruction implementing unit 107 selects the spare disk devices from among the spare disk devices belonging to the different FC-ALs and shelves.

If the number of the selected spare disk devices is still smaller than the number of the spare disk devices to be used for the data recovery, the reconstruction implementing unit 107 selects the spare disk devices from among the spare disk drives belonging to either the different FC-ALs or the different shelves.

Thereafter, if the number of the selected spare disk devices is still smaller than the number of the spare disk devices to be used for the data recovery, the reconstruction implementing unit 107 selects the spare disk devices from among the spare disk drives belonging to the same FC-ALs and shelves.

As described, after selecting as many spare disk devices as the spare disk devices to be used for the data recovery, the reconstruction implementing unit 107 sets the selected spare disk devices as the spare disk devices for the data recovery destinations (step S207), and terminates the processing of selecting the spare disk devices as the data recovery destinations.

When the number of the selected spare disk devices is not larger than the number of the spare disk devices to be used for the data recovery, that is, the number of the selected spare disk devices is the same as the number of the spare disk devices to be used for the data recovery (NO at step S205), the process proceeds to step S207, and the reconstruction implementing unit 107 sets the spare disk devices selected at step S204 as the data recovery destinations and terminates the processing of selecting the spare disk devices as the data recovery destinations.

Figure 14:
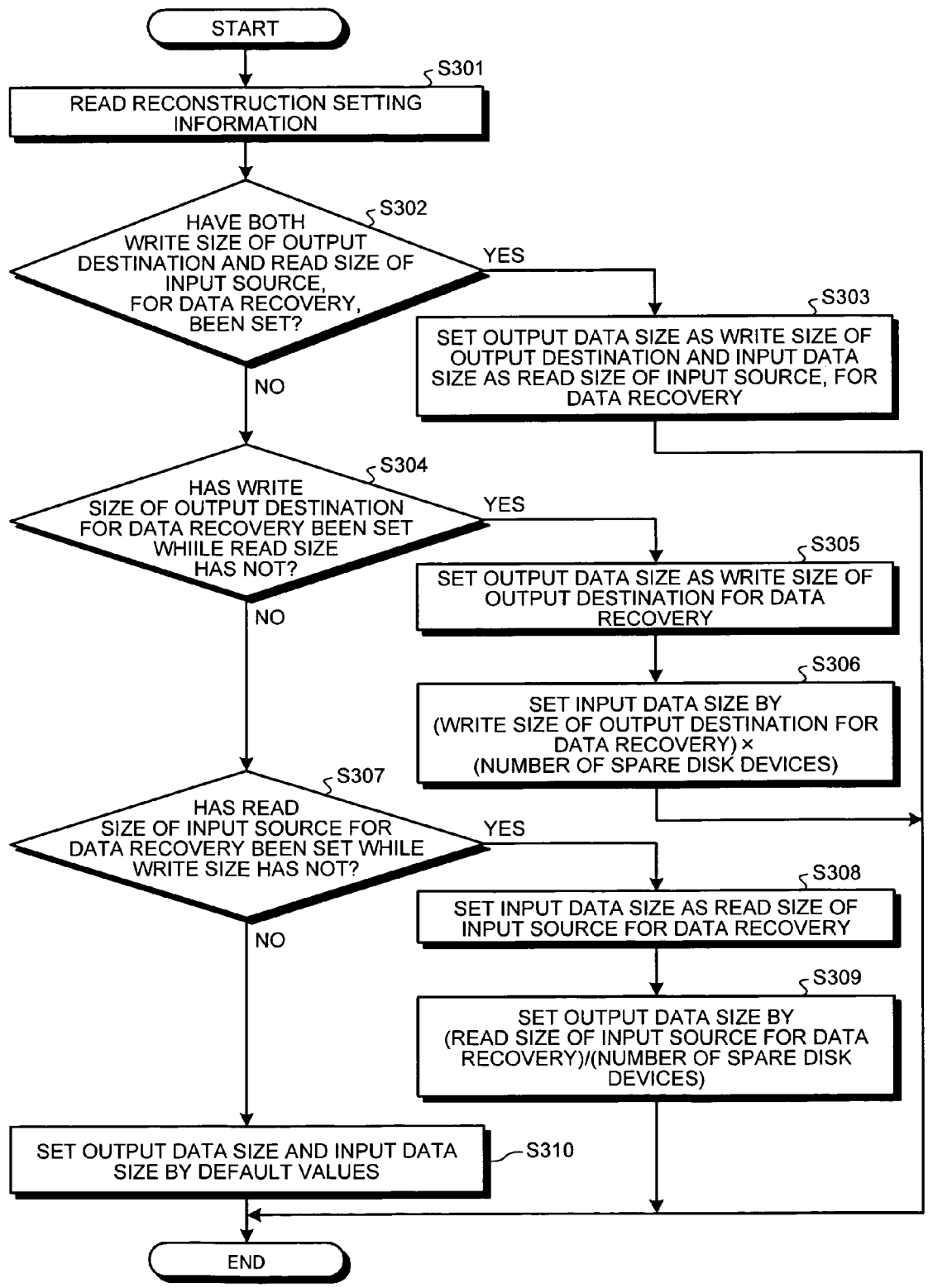
FIG. 14 is a flowchart of a processing procedure shown in FIG. 12, of setting data-read/write size for data recovery.

FIG. 14 is a flowchart of a processing procedure shown in FIG. 12, of setting the data read/write size for the data recovery.

The data-size adjusting unit 106 in the storage device 10 reads the reconstruction setting information 103c (step S301), and checks whether the write size of the output destination for the data recovery and the read size of the input source for the data recovery have been set in the reconstruction setting information 103c (step S302).

When the write size of the output destination for the data recovery and the read size of the input source for the data recovery have been set in the reconstruction setting information 103c (YES at step S302), the data-size adjusting unit 106 sets the output data size for each spare disk when the recovered data is written into the spare disk devices by the striping as the write size of the output destination for the data recovery, and sets the input data size for each disk device when the user data and the parity used for generating the recovered data are read from the disk devices as the read size of the input source for the data recovery (step S303). Thereafter, the data-size adjusting unit 106 terminates the processing of setting the data read/write size for the data recovery.

When both the write size of the output destination for the data recovery and the read size of the input source for the data recovery have not been set in the reconstruction setting information 103c (NO at step S302), the data-size adjusting unit 106 checks whether the write size of the output destination for the data recovery has been set while the read size of the input source for the data recovery has not in the reconstruction setting information 103c (step S304).

When the write size of the output destination for the data recovery has been set while the read size of the input source for the data recovery has not in the reconstruction setting information 103c (YES at step S304), the data-size adjusting unit 106 sets the output data size for each spare disk when the recovered data is written into the spare disk devices by the striping as the write size of the output destination for the data recovery (step S305).

The data-size adjusting unit 106 sets the input data size for each disk device when the user data and the parity used for generating the recovered data are read from the disk devices, by (write size of the output destination for the data recovery)×(the number of the spare disk devices for storing the recovered data) (step S306). Thereafter, the data-size adjusting unit 106 terminates the processing of setting the data read/write size for the data recovery.

In the case other than the case that the write size of the output destination for the data recovery has been set while the read size of the input source for the data recovery has not in the reconstruction setting information 103c (NO at step S304), the data-size adjusting unit 106 checks whether the read size of the input source for the data recovery has been set while the write size of the output destination for the data recovery has not in the reconstruction setting information 103c (step S307).

When the read size of the input source for the data recovery has been set while the write size of the output destination for the data recovery has not in the reconstruction setting information 103c (YES at step S307), the data-size adjusting unit 106 sets the input data size for each disk device when the user data and the parity used for generating the recovered data are read from the disk devices as the read size of the input source for the data recovery (step S308).

The data-size adjusting unit 106 sets the write size for storing the recovered data in the spare disk devices by the striping, by (read size of the input source for the data recovery)/(the number of the spare disk devices for storing the recovered data) (step S309). Thereafter, the data-size adjusting unit 106 terminates the processing of setting the data read/write size for the data recovery.

In the case other than the case that the read size of the input source for the data recovery has been set while the write size of the output destination for the data recovery has not in the reconstruction setting information 103c (NO at step S307), the data-size adjusting unit 106 sets the write size and the read size for the data recovery by predetermined default values (step S310), and terminates the processing of setting the data read/write size for the data recovery.

Figure 15:
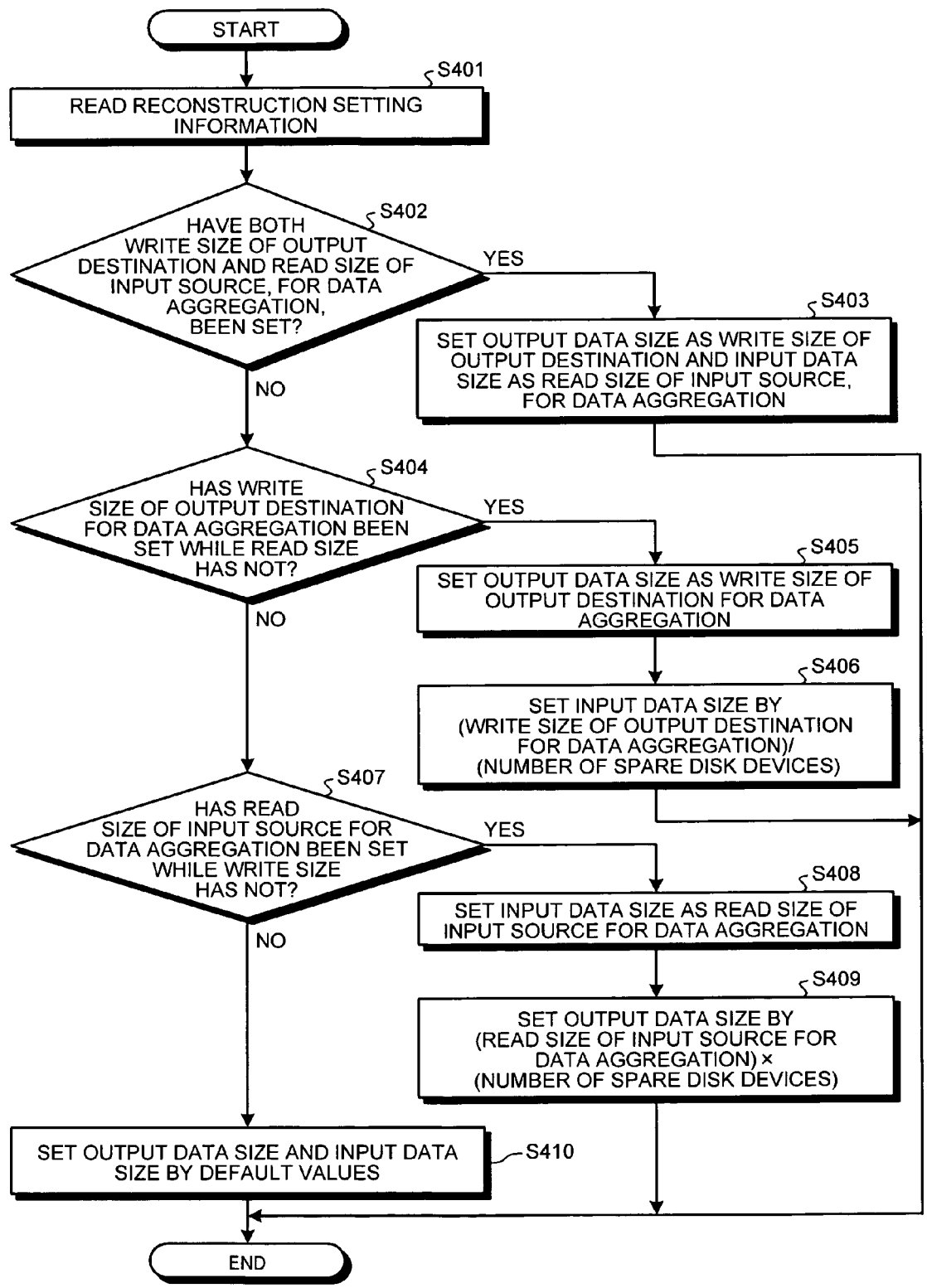
FIG. 15 is a flowchart of a processing procedure shown in FIG. 12, of setting data-read/write size for data aggregation.

FIG. 15 is a flowchart of a processing procedure shown in FIG. 12, of setting the data read/write size for the data aggregation processing.

The data-size adjusting unit 106 in the storage device 10 reads the reconstruction setting information 103c (step S401), and checks whether the write size of the output destination for the data aggregation and the read size of the input source for the data aggregation have been set in the reconstruction setting information 103c (step S402).

When the write size of the output destination for the data aggregation and the read size of the input source for the data aggregation have been set in the reconstruction setting information 103c (YES at step S402), the data-size adjusting unit 106 sets the output data size for aggregating the recovered data stored in the spare disk devices by the striping in a single spare disk device as the write size of the output destination for the data aggregation, and sets the input data size for each spare disk device when the recovered data stored in the spare disk devices is read from each of the spare disk devices as the read size of the input source for the data aggregation (step S403). Thereafter, the data-size adjusting unit 106 terminates the processing of setting the data read/write size for the data aggregation.

When both the write size of the output destination for the data aggregation and the read size of the input source for the data aggregation have not been set in the reconstruction setting information 103c (NO at step S402), the data-size adjusting unit 106 checks whether the write size of the output destination for the data aggregation has been set while the read size of the input source for the data aggregation has not in the reconstruction setting information 103c (step S404).

When the write size of the output destination for the data aggregation has been set while the read size of the input source for the data aggregation has not in the reconstruction setting information 103c (YES at step S404), the data-size adjusting unit 106 sets the output data size for aggregating the recovered data stored in the spare disk devices by the striping in a single spare disk device as the write size of the output destination for the data aggregation (step S405).

The data-size adjusting unit 106 sets the input data size for each spare disk device when the recovered data stored in the spare disk devices is read from each of the spare disk devices, by (write size of the output destination for the data aggregation)/(the number of the spare disk devices for storing the recovered data) (step S406). Thereafter, the data-size adjusting unit 106 terminates the processing of setting the data read/write size for the data aggregation.

In the case other than the case that the write size of the output destination for the data aggregation has been set while the read size of the input source for the data aggregation has not in the reconstruction setting information 103c (NO at step S404), the data-size adjusting unit 106 checks whether the read size of the input source for the data aggregation has been set while the write size of the output destination for the data aggregation has not in the reconstruction setting information 103c (step S407).

When the read size of the input source for the data aggregation has been set while the write size of the output destination for the data aggregation has not in the reconstruction setting information 103c (YES at step S407), the data-size adjusting unit 106 sets the input data size for each spare disk device when the recovered data stored in the spare disk devices is read from each of the spare disk devices as the read size of the input source for the data aggregation (step S408).

The data-size adjusting unit 106 sets the write size for aggregating the recovered data stored in the spare disk devices by the striping in a single spare disk device, by (read size of the input source for the data aggregation)×(the number of the spare disk devices for storing the recovered data) (step S409). Thereafter, the data-size adjusting unit 106 terminates the processing of setting the data read/write size for the data aggregation.

In the case other than the case that the read size of the input source for the data aggregation has been set while the write size of the output destination for the data aggregation has not in the reconstruction setting information 103c (NO at step S407), the data-size adjusting unit 106 sets the write size and the read size for the data aggregation by predetermined default values (step S410), and terminates the processing of setting the data read/write size for the data aggregation.

As described above, according to an embodiment of the present invention, the storing unit 103 stores information on the communication status, such as the busy rates of the FC-ALs and the shelves, related to an arrangement of the disk devices included in the RAID structure, as the system load information 103b. The reconstruction implementing unit 107 selects the spare disk devices for storing the data based on the information stored in the storing unit 103 and stores the recovered data in the selected spare disk devices by the striping. As a result, the data recovery destinations can be properly selected and the reconstruction processing can be performed at a high speed.

Further, according to an embodiment of the present invention, the storing unit 103 stores information of the priority for the processing of storing the recovered data in the spare disk devices by the striping, as the processing-priority setting information 103d. The reconstruction implementing unit 107 determines whether to primarily perform the processing of storing the recovered data in the spare disk devices by the striping other than to perform other processings, i.e., the general data storing/read processing, based on the information of the priority stored in the storing unit 103. When determining to primarily perform the processing of storing the recovered data in the spare disk devices by the striping, the reconstruction implementing unit 107 performs the determined processing. As a result, it become possible to determine which processing is to be primarily performed and it is possible to prevent a performance of the processing with lower priority from affecting a performance of the processing with higher priority.

Moreover, according to an embodiment of the present invention, the setting-information accepting unit 108 accepts a specification of the size of a data block (i.e., write size of the output destination and/or read size of the input source, for the data recovery) used as a unit for a data access operation when the recovered data is stored by the striping. The data-size adjusting unit 106 and the reconstruction implementing unit 107 generates the data block based on the information on the accepted specification of the size and perform the processing of storing the recovered data in the spare disk devices using the generated data blocks. As a result, the processing speed of performing the storing processing of the recovered data and influence to the other processings can be controlled.

Further, according to an embodiment of the present invention, the reconstruction implementing unit 107 aggregates and stores the recovered data stored in the spare disk devices by the striping in a single spare disk device. As a result, it becomes possible to make a structure of the spare disk devices for storing the recovered data simple and make management of the structure easy.

Moreover, according to an embodiment of the present invention, the storing unit 103 store information of the priority for processings of aggregating and storing the recovered data in a single spare disk device, as the processing-priority setting information 103d. The reconstruction implementing unit 107 determines whether to primarily perform the processings of aggregating and storing the recovered data in a single spare disk device other than to perform other processings, based on the information of the priority stored in the storing unit 103. When determining to primarily perform the processings of aggregating and storing the recovered data in a single spare disk device, the reconstruction implementing unit 107 performs the determined processings. As a result, it become possible to determine which processing is to be primarily performed and it is possible to prevent a performance of the processing with lower priority from affecting a performance of the processing with higher priority.

Further, according to an embodiment of the present invention, the setting-information accepting unit 108 accepts a specification of the size of a data block (i.e., write size of the output destination and/or read size of the input source, for the data aggregation) used as a unit for a data access operation when the recovered data is aggregated and stored in a single spare disk device. The data-size adjusting unit 106 and the reconstruction implementing unit 107 generates the data block based on the information on the accepted specification of the size and perform the processings of aggregating and storing the recovered data in a single spare disk device using the generated data blocks. As a result, the processing speed of performing the aggregation processing of the recovered data and influence to the other processing can be controlled.

Moreover, according to an embodiment of the present invention, the storing unit 103 stores information on the spare disk devices in which a storage area is initialized, a health check for determining an occurrence of a failure in the disk devices is implemented, and the occurrence of a failure is not detected by the health check, as the data-aggregation-disk information 103e. The reconstruction implementing unit 107 selects the spare disk devices for storing the aggregated recovered data from among the spare disk devices which information is stored in the storing unit 103, and aggregates and stores the recovered data to the selected spare disk devices. As a result, the spare disk devices ready for being used can be selected and the aggregation processing of the recovered data can be effectively performed.

Further, according to an embodiment of the present invention, the reconstruction implementing unit 107 detects whether the failed disk device has been replaced with the spare disk device. When detecting that the failed disk device has been replaced with the spare disk device, the reconstruction implementing unit 107 aggregates and stores the recovered data in the spare disk device that has been set by the replacement. As a result, it becomes possible to effectively reconstruct the RAID structure.

Moreover, according to an embodiment of the present invention, when the reconstruction implementing unit 107 stores the recovered data in the spare disk devices by the striping, the reconstruction implementing unit 107 saves the necessary areas in each of the storage areas 200a, 200b, and 200c for storing the data (data A to I) stored in the other spare disk devices in a predetermined order. Thereafter, the reconstruction implementing unit 107 stores the data to the saved areas. The reconstruction implementing unit 107 stores the recovered data stored in the other spare disk devices in a striping manner, in the saved areas to aggregate and store the recovered data in a single spare disk device. As a result, it becomes possible to easily aggregate the recovered data in a single spare disk device.

Each of the processings explained in the present embodiment can be realized by executing a predetermined program by the computer. An example of the computer that executes the programs for realizing the various processings will be explained below.

FIG. 16 is a functional block diagram of a computer hardware that realizes functions of the storage device 10. The computer includes an input device 300, a display device 301 that displays various information, a LAN/FC-I/F 302 that transmits and receives data to the host computers 20*a* to 20*c* via the LAN/FC 30, an FC-I/F 303 that transmits and receives data to the shelves 110, 120, 130, and 140 via the FC-ALs 150, 160, and 170, a random access memory (RAM) 304, a central processing unit (CPU) 305, and a read only memory (ROM), all of which are connected by a bus 307.

The ROM 306 stores a program, i.e., a data-recovery control program 306*a* that realizes the same function of the storage device 10. The data-recovery control program 306*a* can be stored in a striping manner.

The CPU 305 reads the data-recovery control program 306*a* from the ROM 306 and executes the data-recovery control program 306*a*, which causes a data-recovery control process 305*a* to be executed. As a result, the functions of the storage device 10 are realized.

The data-recovery control process 305*a* corresponds to each of the function units including the data-storing/read control unit 104, the information collecting unit 105, the data-size adjusting unit 106, the reconstruction implementing unit 107, and the setting-information accepting unit 108.

The CPU 305 stores system configuration information 304*a*, system load information 304*b*, reconstruction setting information 304*c*, processing-priority setting information 304*d*, and data-aggregation-disk information 304*e* in the RAM 304, and reads the above information from the RAM 304 to execute the data-recovery control process 305*a*.

Each of the system configuration information 304*a*, the system load information 304*b*, the reconstruction setting information 304*c*, the processing-priority setting information 304*d*, and the data-aggregation-disk information 304*e* corresponds to each of the system configuration information 103*a*, the system load information 103*b*, the reconstruction setting information 103*c*, the processing-priority setting information 103*d*, and the data-aggregation-disk information 103*e* shown in FIG. 3.

The present invention in its broader aspects is not limited to the specific details and representative embodiments shown and described herein. Accordingly, various modifications can be made without departing from the spirit or scope of the general inventive concept as defined by the appended claims and their equivalents.

Of the various types of processing explained in the description of the exemplary embodiments, it is acceptable to manually perform a part or all of the processing that is explained to be performed automatically. Conversely, it is acceptable to automatically perform, using a publicly-known technique, a part or all of the processing that is explained to be performed manually.

In addition, the processing procedures, the controlling procedures, the specific names, and the information including various types of data and parameters that are presented in the text and the drawings can be modified in any form, except when it is noted otherwise.

The constituent elements of the apparatuses shown in the drawings are based on functional concepts. The constituent elements do not necessarily have to be physically arranged in the way shown in the drawings. In other words, the specific mode in which the apparatuses are distributed and integrated is not limited to the ones shown in the drawing. A part or all of the apparatuses can be distributed or integrated functionally or physically in any arbitrary units, according to various loads and the status of use.

A part or all of the processing functions offered by the apparatuses can be realized by a CPU and a program analyzed and executed by the CPU, or can be realized as hardware with wired logic.

As described above, according to an embodiment of the present invention, it is possible to properly select the data recovery destinations and perform the reconstruction processing at a high speed.

Furthermore, according to an embodiment of the present invention, it become possible to determine which processing is to be primarily performed and it is possible to prevent a performance of the processing with lower priority from affecting a performance of the processing with higher priority.

Moreover, according to an embodiment of the present invention, the processing speed of performing the storing processing of the recovered data and influence to the other processing can be controlled.

Furthermore, according to an embodiment of the present invention, it is possible to make a structure of the spare disk devices for storing the recovered data simple, and make management of the structure easy.

Moreover, according to an embodiment of the present invention, it become possible to determine which processing is to be primarily performed and it is possible to prevent a performance of the processing with lower priority from affecting a performance of the processing with higher priority.

Furthermore, according to an embodiment of the present invention, the processing speed of performing the aggregation processing of the recovered data and influence to the other processings can be controlled.

Moreover, according to an embodiment of the present invention, the spare disk devices ready for being used can be selected and the aggregation processing of the recovered data can be effectively performed.

Furthermore, according to an embodiment of the present invention, it becomes possible to effectively reconstruct the RAID structure.

Moreover, according to an embodiment of the present invention, it becomes possible to easily aggregate the recovered data in a single spare disk device.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device for performing a recovery control of data stored in a storage device from which a failure is detected from among a plurality of storage devices forming a disk array, the device comprising:

a first storing unit that stores therein first information on a communication load relating to installing positions of the storage devices;

a selecting unit that selects a plurality of storage devices for storing data, based on stored first information; and a second storing unit that stores recovery data in selected storage devices in a striping manner.

2. The device according to claim 1, further comprising:

a third storing unit that stores second information on a priority of a process of storing the recovery data, wherein the second storing unit determines, based on stored second information, whether to perform the process of storing the recovery data in priority, and upon determining to perform the process of storing the recovery data in priority, executes the process of storing the recovery data.

3. The device according to claim 1, further comprising:

a setting unit that sets a unit size of a data block for performing the process of storing the recovery data, wherein the second storing unit generates the data block based on set unit size, and stores the recovery data in the storage devices in striping manner, using generated data block.

4. The device according to claim 1, further comprising:

an aggregating unit that aggregates the recovery data stored in the storage devices in a single storage device.

5. The device according to claim 4, further comprising:

a fourth storing unit that stores therein third information on a priority of a process of aggregating the recovery data, wherein the aggregating unit determines, based on stored third information, whether to perform the process of aggregating the recovery data in priority, and upon determining to perform the process of aggregating the recovery data in priority, executes the process of aggregating the recovery data.

6. The device according to claim 4, further comprising:

a setting unit that sets a unit size of a data block for performing the process of aggregating the recovery data, wherein the aggregating unit generates the data block based on set unit size, and aggregates the recovery data in the single storage device, using generated data block.

7. The device according to claim 4, further comprising:

a fifth storing unit that stores fourth information on a storage device, of which a storage area is initialized and from which no failure is detected, wherein the aggregating unit selects a storage device from among storage devices stored in the fifth storing unit, as the single storage device.

8. The device according to claim 4, further comprising:

a detecting unit that detects a replacement of the storage device from which the failure is detected by other storage device, wherein the aggregating unit aggregates, upon the detecting unit detecting the replacement of the storage device by the other storage device, the recovery data in the other storage device.

9. The device according to claim 4, wherein when storing the recovery data in the storage devices in a striping manner, the second storing unit stores the recovery data while securing a space for storing recovery data stored in other storage devices in a predetermined order, and the aggregating unit aggregates the recovery data in the single storage device by storing the recovery data stored in the other storage devices in the space secured in the single storage device.

10. A method of performing a recovery control of data stored in a storage device from which a failure is detected from among a plurality of storage devices forming a disk array, the method comprising:

storing first information on a communication load relating to installing positions of the storage devices;

selecting a plurality of storage devices for storing data, based on stored first information; and storing recovery data in selected storage devices in a striping manner.

11. A computer-readable recording medium that stores therein a computer program for performing a recovery control of data stored in a storage device from which a failure is detected from among a plurality of storage devices forming a disk array, wherein the computer program causes a computer to execute:

storing first information on a communication load relating to installing positions of the storage devices;

selecting a plurality of storage devices for storing data, based on stored first information; and storing recovery data in selected storage devices in a striping manner.

* * * * *